Oct. 8, 1940.　　　　O. SCHMUTZ　　　　2,217,457
GENERATOR VOLTAGE REGULATOR
Filed Feb. 18, 1938　　　2 Sheets-Sheet 1
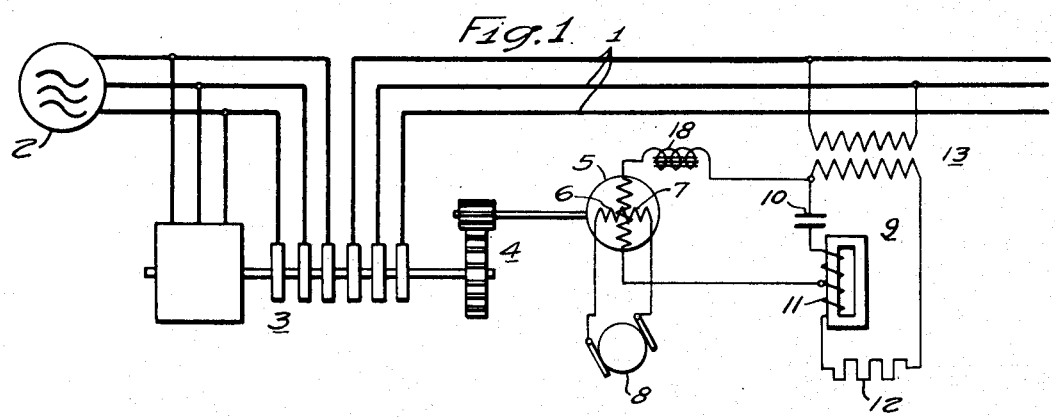
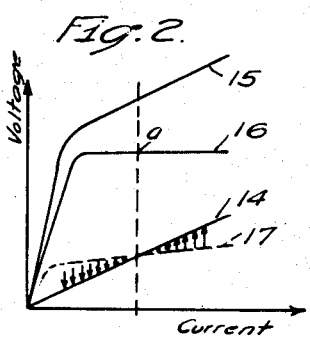
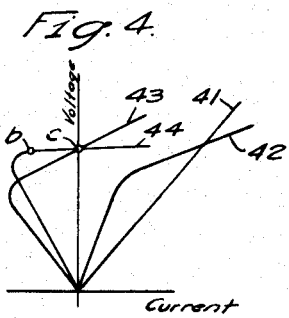
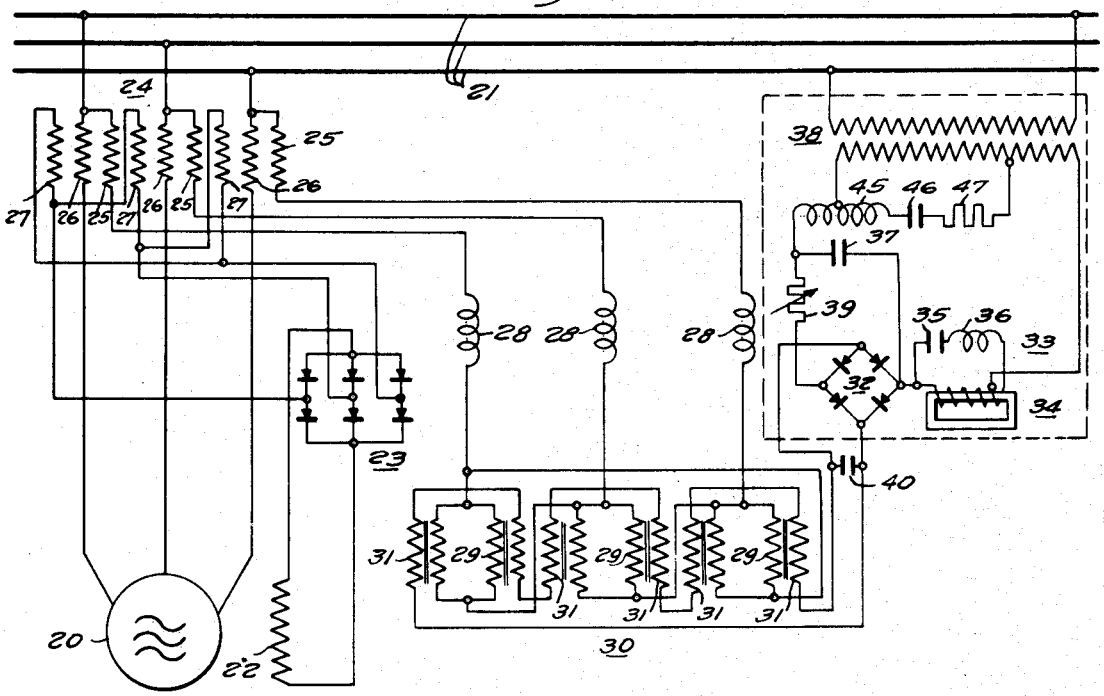
WITNESSES:
E. A. McCloskey
F. P. Lyle
INVENTOR
Oskar Schmutz.
BY
O. B. Buchanan
ATTORNEY Oct. 8, 1940.  O. SCHMUTZ  2,217,457
GENERATOR VOLTAGE REGULATOR
Filed Feb. 18, 1938  2 Sheets-Sheet 2
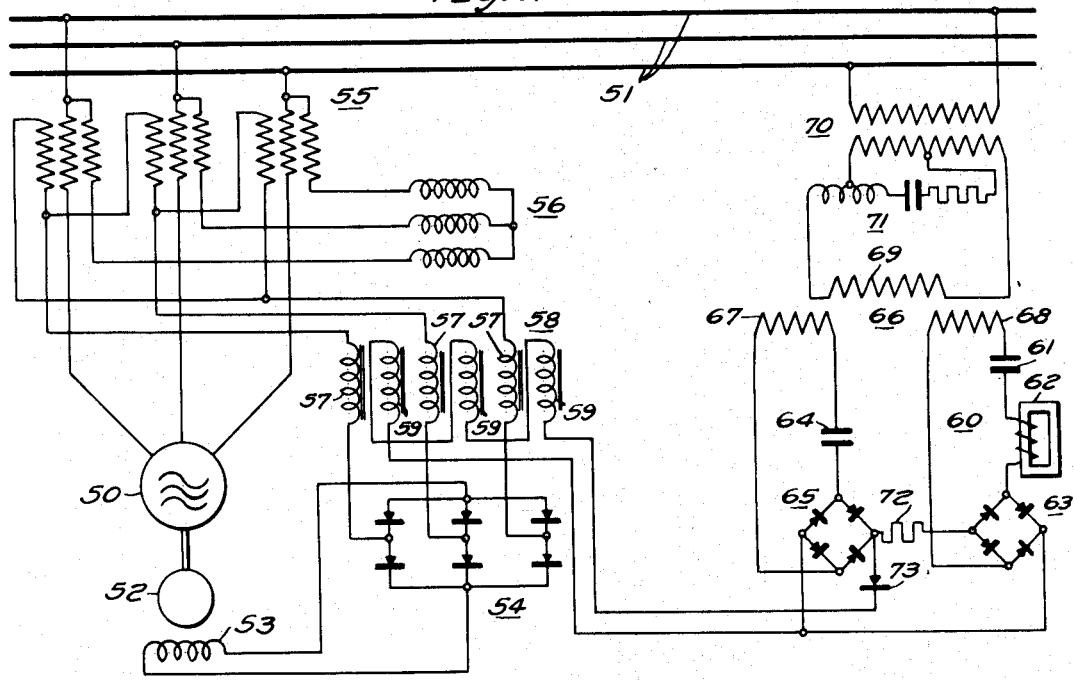
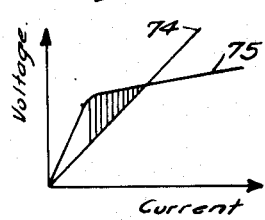
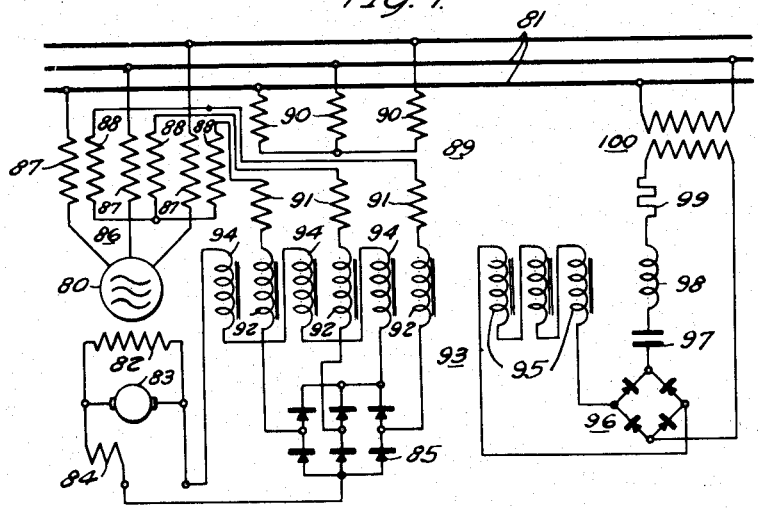
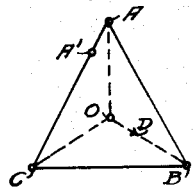
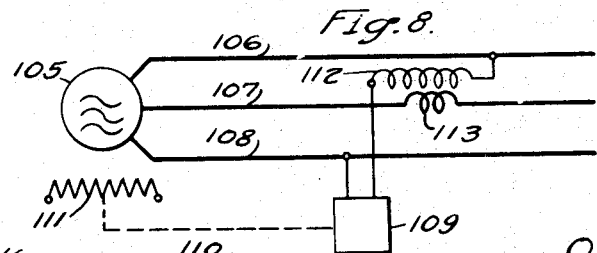
WITNESSES:
E. A. M°Closkey
F. P. Lyle
INVENTOR
Oskar Schmutz
BY O. B. Buchanan
ATTORNEY Patented Oct. 8, 1940

2,217,457

UNITED STATES PATENT OFFICE 2,217,457

GENERATOR VOLTAGE REGULATOR

Oskar Schmutz, Berlin-Haselhorst, Germany, assignor to Westinghouse Electric & Manufacturing Company, East Pittsburgh, Pa., a corporation of Pennsylvania Application February 18, 1938, Serial No. 191,244
In Germany February 25, 1937

15 Claims. (Cl. 171—119)

The present invention relates broadly to regulating systems for the control of a variable quantity such as a voltage, and is particularly suitable for the regulation of the voltage of an alternating current generator.

In such regulating systems it is desirable to obtain a rapid and positive response to changes in voltage and to avoid hunting or overshooting of the desired value. These results are obtained in the present invention by using a resonant or tuned circuit; i. e., a circuit containing inductance and capacitance which can be so adjusted that a small change in the impressed voltage causes a relatively much larger change in the current in the circuit. If such a circuit is energized from the voltage to be regulated, the current in the circuit or the voltage drop across a part of it may be used as a control current or voltage to actuate a controlling device for the voltage to be regulated. Such a system gives a very rapid and positive response and can be made extremely sensitive because of the above mentioned relation between the current and voltage in a resonant circuit.

One very advantageous way in which such a system can be applied to regulating the voltage of an alternating current generator is to use the current in the resonant circuit to control the direct current magnetization of a reactor which has an alternating current winding connected in a rectifier circuit which supplies the generator excitation. Variation of this direct current will effect variations in the reactance of the alternating current winding and thus control the excitation of the generator.

The accuracy and reliability of such a system obviously depends upon the frequency of the voltage impressed on the resonant circuit and variations in this frequency will cause unsatisfactory operation. The invention therefore provides means for compensating for such variations in frequency in order to make the operation of the system completely satisfactory.

The object of the invention, therefore, is broadly to provide a voltage regulating system which will be rapid and positive in operation and which will have no tendency to hunt or to overshoot the desired value of the voltage.

A more specific object is to provide a voltage regulating system in which a resonant circuit is used to provide a control current or voltage so that the system can be made very sensitive in order to hold the voltage very accurately at its desired value.

A further object is to provide a voltage regulating system which will have no contacts or other moving parts which require maintenance or adjustment.

A still further object is to provide means to compensate for the effect of changes in frequency in a regulating system using a resonant circuit.

The invention will be more fully understood from the following detailed description taken in connection with the accompanying drawings in which:

Figure 1 shows an illustrative embodiment of the invention;

Fig. 2 shows certain characteristic curves for the circuit of Fig. 1;

Fig. 3 is a generator voltage regulating system embodying the invention;

Fig. 4 shows certain characteristic curves for the circuit of Fig. 3;

Fig. 5 is a generator voltage regulating system showing another embodiment of the invention;

Fig. 6 shows certain characteristic curves for the circuit of Fig. 5;

Fig. 7 is a generator voltage regulating system showing a further embodiment of the invention;

Fig. 8 is a diagram showing a preferred arrangement for compensating for change in frequency; and Fig. 9 is a vector diagram illustrating the operation of the circuit of Fig. 8.

Figure 1 shows a simplified embodiment of the invention as applied to the regulation of the voltage of a three-phase alternating current line 1 supplied from a three-phase generator 2. A regulating device indicated generally at 3 is provided to control the voltage and may be either an induction regulator or a tap-changing transformer which is actuated through suitable reduction gearing 4 from a two-phase motor 5 having windings 6 and 7. The winding 6 is connected to a source of constant alternating voltage 8 or, if preferred, it may be connected across one phase of the line 1 through a suitable transformer or series resistance. The other winding 7 of the motor 5 is energized by the voltage drop across a part of the resonant circuit 9, which serves as a control voltage. The resonant circuit consists of a capacitor 10, an iron-core inductance 11 and a non-inductive resistance 12, which are connected in series and energized from the line 1 through a suitable transformer 13. As shown in the drawings, the winding 7 is energized by the voltage drop across the capacitor 10 and a part of the inductance 11, preferably about one-fourth of this inductance.

The operation of this system will be more clearly understood from a consideration of the curves of Fig. 2, in which the curve 14 shows the relation between the current in the circuit 9 and the voltage drop across the capacitor 10, the curve 15 shows the voltage drop across the inductance 11, and curve 16 shows the resultant voltage drop across the entire circuit which is equal to the vector sum of the drops in the elements 10, 11 and 12, and is proportional to the line voltage. It will be seen that the circuit is so designed that the curve 16 is almost horizontal in the vicinity of the point $a$ which corresponds to the desired value of line voltage. The curve 17 shows the voltage drop across one-fourth of the inductance 11 and it will be seen that for the value of current corresponding to the point $a$, the two components of the control voltage are equal. Since these two voltages are equal and out of phase, the resultant voltage impressed on the winding 7 will be zero.

If the line voltage varies from its normal value so that the voltage impressed on the resonant circuit varies correspondingly, there will be a relatively large change in the current in the circuit and the two components of the voltage applied to the winding 7 will no longer be equal. A resultant voltage greater than zero will therefore be impressed on the winding 7, the magnitude of which depends on the magnitude of the variation of the line voltage from its normal value. This causes rotation of the motor 5, which actuates the regulating device 3 to bring the line voltage back to its normal value. The direction of rotation of the motor 5 will depend upon the phase of the control voltage, i. e., whether it is leading or lagging with respect to the voltage on the winding 6, and this depends on whether the line voltage rises or falls, which determines whether the capacitive or the inductive component of the resultant voltage on the winding 7 is greater. The motor 5 will therefore rotate in the proper direction to bring the voltage back to its normal value.

In case a tap-changing transformer is used as a regulating device, it is desirable to connect an iron-core reactor 18 in series with the winding 7. This reactor should have a low saturation voltage, the value of which should preferably be somewhat less than twice the voltage between adjacent taps on the transformer. The control voltage must then exceed the voltage between taps before the motor 5 will operate to actuate the transformer.

It will be seen that this system can be made quite sensitive because of the large change in current caused by a small change in the voltage to be controlled, as shown by the curve 16. It should also be obvious that the usefulness of this system is not limited to voltage regulation but that it can be used for the regulation of other quantities in any case in which an alternating voltage can be derived proportional to the quantity to be regulated. For example, the temperature of a furnace or of an oven might be regulated by deriving an alternating voltage from the temperature measuring means and applying it to the primary of the transformer 13. The motor 5 could then be used to actuate a rheostat or other controlling means in the heating system of the furnace.

The system above described can be readily adapted to control the voltage of a generator by using the current of the resonant circuit to control the generator excitation. This may be done so that a system is obtained which has no contacts or other moving parts and therefore one which requires a minimum of maintenance and attention. Such a system can be obtained by the use of an iron-core reactor having a direct current winding on it and an alternating current winding connected in a rectifier circuit which supplies part or all of the excitation. The direct current winding magnetizes the core of the reactor, and by varying the current in it, the degree of saturation of the core may be varied and therefore the reactance of the alternating current winding correspondingly controlled.

One embodiment of the invention as applied to such a system is illustrated in Fig. 3. In this figure a three-phase synchronous generator 20 is shown connected to supply a line 21. The generator is provided with an exciting winding 22 which is supplied with direct current from a rectifier 23. Any suitable type of rectifier may be used such as a plurality of copper oxide rectifier cells connected in any suitable polyphase arrangement. The rectifier 23 is supplied with alternating current from a three-phase transformer 24 which has three windings for each phase. The primary windings 25 are connected across the generator voltage, the secondary windings 26 are connected in series with the generator leads while the tertiary windings 27 are connected to the rectifier 23. The arrangement is such that the current induced in the windings 27 is composed of two superposed components induced respectively by the windings 25 and 26. It will be obvious that the component induced by the winding 25 will be substantially independent of the load on the generator, while the component induced by the winding 26 will vary with the load. The excitation will therefore vary with the load so as to tend to maintain the generator voltage constant with changes in load.

In order to provide a more accurate control of the voltage which may vary from other causes such as change in power factor, the primary windings 25 of the transformer 24 are connected through current-limiting reactors 28 to the alternating current windings 29 of an iron-core reactor 30. This reactor may consist of a three-phase core having six legs with both alternating current and direct current windings on each leg, or it may consist of six single-phase reactors each having two windings. The direct current windings 31 of the reactor 30 are connected in series to a rectifier 32 and alternating current is supplied to this rectifier from a resonant circuit indicated generally at 33. This circuit consists of two parallel branches, one of which contains an iron-core inductance 34 while the other contains a capacitor 35 and a reactor 36. This circuit is connected through a capacitor 37 to a transformer 38 which is connected across the generator voltage. The rectifier 32 is connected through a variable resistance 39 across the capacitor 37 so that the voltage drop across this capacitor is used as a control voltage to supply the direct current magnetization of the reactor 30. A suitable capacitor 40 of relatively large size is connected across the winding 31 in order to prevent undesirable oscillations of the current.

Fig. 4 shows the relation between current and voltage drop in the various parts of this circuit. Curve 41 shows the voltage drop across the capacitor 35 and curve 42 shows the voltage drop across the inductance 34. The resultant of these two drops or the voltage across the circuit 33 is shown in curve 43 and the resultant voltage across the entire circuit is shown in curve 44. It will be seen from this latter curve that if the working range of the system is between the points b and c, the curve is almost horizontal and a small change in the impressed voltage will cause a large change in the current in the circuit. This will cause a corresponding change in the current supplied by the rectifier to the winding 31. If the generator voltage rises above its desired value, the current will decrease sharply. This correspondingly reduces the current in the winding 31, thereby decreasing the magnetization of the core of the reactor 30. This has the effect of increasing the reactance of the winding 29 which, of course, lowers the current in the transformer winding 25 and decreases the excitation of the generator to bring the voltage back to its desired value. If the generator voltage decreases, the operation will be the reverse of that described.

Since the operation of this system depends on the relation of current and voltage in a resonant circuit, it is obvious that its accuracy will be affected by changes in the frequency of the applied voltage. If, for example, the frequency increases, the system will tend to hold the voltage at a somewhat higher value than before. Since the voltage impressed on the resonant circuit rather than the actual generator voltage determines the operation of the system however, the effect of change in frequency can be compensated by correspondingly changing this impressed voltage so that its new value for the changed frequency will correspond to the same generator voltage as before. If this is done automatically, the system will maintain the generator voltage constant irrespective of changes in frequency. Any suitable means for effecting such compensation may be used, and one simple arrangement is shown in the drawings consisting of a circuit comprising a reactor 45, a capacitor 46 and a resistor 47 connected across the transformer 38. This circuit is so adjusted that when the frequency of the impressed voltage rises, the voltage drop across this circuit will decrease and thus cause the voltage across the circuit 33 to rise.

Fig. 5 shows another embodiment of the invention in which a control current is obtained from the difference of two currents, one of which is obtained from a resonant circuit. As shown in this figure, a three-phase synchronous generator 50 supplies a line 51 and has an exciter 52 provided with a field winding 53. The field 53 is supplied with direct current from a rectifier 54 which may be similar to the rectifier 23 described above. This rectifier is supplied with alternating current from a three-phase transformer 55 which is similar to the transformer 24 and is connected in the same way. A three-phase current-limiting reactor 56 is connected across the primary windings of this transformer and its secondary windings are connected in series with the generator leads. The tertiary windings are connected to the rectifier 54 in series with the alternating current windings 57 of a three-phase iron-core reactor 58. The reactor 58 has a direct current winding 59 which is energized by a control current obtained through rectifiers from the difference of the currents in two separately energized circuits. These circuits comprise a resonant circuit 60 consisting of a capacitor 61 and an iron-core inductance 62 connected in series to a rectifier 63 and a circuit consisting of a capacitor 64 connected in series to a rectifier 65. The circuit 60 and the capacitor 64 are separately energized with equal voltages from a transformer 66 having two secondary windings 67 and 68, respectively.

The primary winding 69 of this transformer is energized from the generator voltage through a suitable transformer 70. If desired, a circuit 71 may be provided to compensate for change in frequency in the same manner as the circuit described in connection with Fig. 3. The alternating currents of the circuit 60 and the capacitor 64 are rectified by the rectifiers 63 and 65, respectively, and these are connected through a resistance 72 to the winding 59 so that the direct currents supplied by them oppose each other. The excitation of this winding will thus be equal to the difference of the currents in the circuit 60 and the capacitor 64. In order to prevent reversal of the current in the winding 59 in case the current in the circuit 60 should become greater than that of the capacitor 64, a rectifier element 73 is connected in series with the winding.

The operation of this system is illustrated by the curves of Fig. 6 in which the curve 74 shows the relation between voltage and current for the capacitor 64 and the curve 75 shows this relation for the circuit 60. If the working range of the system is within the shaded area of Fig. 6, it will be seen that a small rise in the impressed voltage, which is proportional to the generator voltage, will result in a large decrease in the difference between the two currents. This will lower the magnetization of the reactor 58 which increases the reactance of its alternating current winding. The current flowing to the rectifier 54 will, therefore, be decreased and this lowers the excitation of the generator to bring its voltage back to the desired value.

Fig. 7 shows a further modification of the regulating system of the present invention. In this figure a three-phase synchronous generator is indicated at 80 connected to a line 81. This generator has a field winding 82 supplied by an exciter 83 which has a field winding 84. The exciter is so designed that self-excitation of the field winding 84 is not sufficient alone and this winding is connected in series with a rectifier 85 which may be similar to those described above. To supply alternating current to the rectifier 85 a three-phase transformer 86 is provided having its primary windings 87 connected in series with the generator leads and having secondary windings 88. A second transformer 89 is also provided having primary windings 90 connected across the generator voltage and secondary windings 91. The windings 88 and 91 and the alternating current windings 92 of an iron-core reactor 93 are connected in series to the rectifier 85. The reactor 93 may be similar in general to the reactors 30 and 58 described above, but differs in that it has two direct current windings 94 and 95. The winding 94 is connected in series between the field winding 84 and rectifier 85. The second direct current winding 95 is connected so that it opposes the winding 94 and it is supplied with direct current from a rectifier 96. This rectifier is supplied with alternating current from a resonant circuit consisting of a capacitor 97, an inductance 98 and a non-inductive resistance 99 connected in series to the rectifier and energized from the generator voltage through a suitable transformer 100.

The operation of this system is similar to that of the systems described above. A relatively small change in the impressed voltage will cause a large change in the current in the resonant circuit, and therefore, a corresponding change in the current in the winding 95. If the generator voltage rises, the current in the winding 95 will increase and, since this winding opposes the winding 94, the resultant magnetization of the core of the reactor 93 is decreased, raising the reactance of the alternating current winding 92 and thus lowering the excitation of the generator. Any desired means may be used to compensate for change in frequency such as a circuit similar to that described in connection with Fig. 3.

The particular advantage of this embodiment of the invention lies in the provision of the direct current winding 94 in series with the rectifier 85. This makes it possible to use this winding to furnish the major part of the magnetization of the reactor 93 and to use the winding 95 only to control this magnetization. Since the desired variations are relatively small, the current in the winding 95 will also be small, so that the transformer 100 and the resonant circuit connected thereto need supply only a relatively small control current.

Three different methods of supplying excitation for the generator have been illustrated in connection with the three embodiments of the invention described above. It is to be understood that any one of these arrangements may be used with each embodiment and that it would also be possible to use other arrangements, such as auxiliary field windings on the exciter or on the generator itself which might be connected either in opposition to the main winding or aiding it, so that variation of their currents would vary the resultant excitation. It is also to be understood that the control circuit may be arranged so that the control current will either increase or decrease when the generator voltage increases and the excitation system of the generator should be arranged accordingly so that the resultant excitation will be changed in the proper direction to bring the voltage back to its normal value.

Reference has been made above to the effect of change of frequency on the operation of this system, and one possible means of compensating for this effect has been described. In Fig. 8 is shown diagrammatically a preferred arrangement for effecting such compensation in cases where the change in frequency may be considered dependent on change in the load on the generator. As shown in this figure, a generator 105 is connected to a three-phase line having conductors 106, 107 and 108. A control system for the generator voltage is indicated diagrammatically at 109 and preferably comprises a resonant circuit connected so as to control the generator excitation by any of the methods described above as indicated diagrammatically at 110. The generator field is indicated at 111. The resonant circuit of the control system 109 is shown as being connected across the phase conductors 106 and 108. In order to compensate for changes in frequency, the secondary winding 112 of an air-core transformer is connected in series with the resonant circuit and the primary winding 113 is connected in the phase conductor 107. The effect of this connection will be understood from the vector diagram of Fig. 9. In this figure, the voltages between conductors 106 and 107, 107 and 108 and 106 and 108 are indicated by the vectors AB, BC and AC, respectively. The active component of the load current in conductor 107 is indicated by the vector OD and this current flowing in the primary 113 of the air-core transformer will induce in the secondary 112 a quadrature voltage AA'. This voltage will be in phase opposition to the voltage AC and the resultant voltage impressed on the resonant circuit will therefore be A'C. If the load on the generator changes, resulting in a change in speed and, therefore in the frequency, the current component OD will change and the voltage AA' will also change correspondingly. If, for example, the load increases, the frequency will tend to decrease and as the voltage AA' rises, the voltage A'C impressed on the resonant circuit will decrease, thus automatically effecting the necessary compensation to make the operation of the regulating system independent of the change in frequency. This arrangement may be used with any of the foregoing embodiments of the invention when the characteristics of the generator are such that its speed, and therefore the frequency, changes with the load in an approximately linear relation within the normal load range.

It will be seen from the above description that a regulating system has been provided which, by the use of a control current of voltage obtained from a resonant circuit, may be made very sensitive and accurate, as well as being rapid and positive in its response. This system has been illustrated as applied to the regulation of a generator voltage, for which purpose it is particularly well adapted, but it is to be understood that its usefulness is not restricted to this particular application and that it may equally well be used for the regulation of other quantities from which an alternating voltage can be derived.

Although certain specific embodiments of the invention have been illustrated and described, it is to be understood that it is not limited to these particular arrangements but that, in its broadest aspects, it includes all equivalent embodiments and arrangements which come within the scope of the appended claims.

I claim as my invention:

1. A system for regulating the voltage of an alternating current generator comprising a rectifier for supplying direct current to the exciting system of the generator, means for supplying alternating current to the rectifier and means for controlling said alternating current in response to changes in the generator voltage comprising an iron-core reactor connected to the rectifier circuit and having a direct current winding, a second rectifier connected to said winding, a resonant circuit connecting said second rectifier to the generator voltage, and means connected in said resonant circuit to compensate for the effect of changes in frequency of the generator voltage.

2. A system for regulating the voltage of an alternating current generator comprising a rectifier for supplying direct current to the exciting system of the generator, means for supplying alternating current to the rectifier and means for controlling said alternating current in response to changes in the generator voltage comprising a reactor connected to the rectifier circuit and having a direct current winding, a second rectifier connected to said winding, and means energized from the generator voltage to supply alternating current to said second rectifier, comprising a circuit which includes inductance and capacitance so adjusted that a small change in voltage causes a relatively large change in the current in the circuit, and means connected in said circuit to compensate for the effect of changes in frequency of the generator voltage.

3. A system for regulating the voltage of an alternating current generator comprising a rectifier for supplying direct current to the exciting system of the generator, means for supplying alternating current to the rectifier from the generator, said current including a component proportional to the load on the generator and a component independent of the load and means for controlling said alternating current comprising a reactor connected to the rectifier circuit and means for varying the reactance of said reactor in response to changes in the generator voltage.

4. A system for regulating the voltage of an alternating current generator comprising a rectifier for supplying direct current to the exciting system of the generator, means for supplying alternating current to the rectifier from the generator, said current including a component proportional to the load on the generator and a component independent of the load and means for controlling said alternating current comprising a reactor connected to the rectifier circuit and having a direct-current winding, and means for causing a relatively large change in the current in said winding in response to a small change in the generator voltage.

5. A system for regulating the voltage of an alternating current generator comprising a rectifier for supplying direct current to the exciting system of the generator, means for supplying alternating current to the rectifier from the generator, said current including a component proportional to the load on the generator and a component independent of the load and means for controlling said alternating current comprising a reactor connected to the rectifier circuit and having a direct current winding, a second rectifier connected to said winding, means for supplying alternating current to said second rectifier and means for varying said current in response to changes in the generator voltage.

6. A system for regulating the voltage of an alternating current generator comprising a rectifier for supplying direct current to the exciting system of the generator, means for supplying alternating current to the rectifier from the generator, said current including a component proportional to the load on the generator and a component independent of the load and means for controlling said alternating current comprising a reactor connected to the rectifier circuit and having a direct current winding, a second rectifier connected to said winding and a resonant circuit connecting the rectifier to the generator voltage.

7. A system for regulating the voltage of an alternating current generator comprising a rectifier for supplying direct current to the exciting system of the generator, means for supplying alternating current to the rectifier from the generator, said current including a component proportional to the load on the generator and a component independent of the load, and means for controlling said alternating current comprising a reactor connected to the rectifier circuit and having a direct current winding, a second rectifier connected to said winding, a resonant circuit energized from the generator voltage for supplying alternating current to the second rectifier, and means connected in said circuit to compensate for the effect of changes in the frequency of said voltage.

8. A system for regulating the voltage of an alternating current generator comprising a rectifier for supplying direct current to the exciting system of the generator, means for supplying an alternating current to the rectifier having a component proportional to the load on the generator and a component independent of the load, a reactor connected to the circuit of said alternating current, a direct current winding on the reactor, means for supplying direct current to said winding and means for causing a relatively large change in said current in response to a small change in the generator voltage.

9. A system for regulating the voltage of an alternating current generator comprising a rectifier for supplying direct current to the exciting system of the generator, means for supplying an alternating current to the rectifier having a component proportional to the load on the generator and a component independent of the load, a reactor connected to the circuit of said alternating current, a direct current winding on the reactor, a second rectifier connected to said winding, and a resonant circuit connecting the second rectifier to the generator voltage.

10. A system for regulating the voltage of an alternating current generator comprising a rectifier for supplying direct current to the exciting system of the generator, means for supplying an alternating current to the rectifier having a component proportional to the load on the generator and a component independent of the load, a reactor connected to the circuit of said alternating current, a direct current winding on the reactor, a second rectifier connected to said winding, and a resonant circuit connecting the second rectifier to the generator voltage, and means connected in said circuit to compensate for the effect of changes in the frequency of the voltage.

11. A system for regulating the voltage of an alternating current generator comprising a rectifier for supplying direct current to the exciting system of the generator, means for supplying an alternating current to the rectifier having a component proportional to the load on the generator and a component independent of the load, a reactor through which said alternating current flows, a first direct-current winding on the reactor connected in series with the rectifier, a second direct-current winding on the reactor, means for supplying current to said second winding and means for causing a relatively large change in said current in response to a small change in the generator voltage.

12. A system for regulating the voltage of an alternating current generator comprising a rectifier for supplying direct current to the exciting system of the generator, means for supplying an alternating current to the rectifier having a component proportional to the load on the generator and a component independent of the load, a reactor through which said alternating current flows, a first direct-current winding on the reactor connected in series with the rectifier, a second direct-current winding on the reactor, a second rectifier connected to said second winding and a resonant circuit connecting the second rectifier to the generator voltage.

13. A system for regulating the voltage of an alternating current generator comprising a rectifier for supplying direct current to the exciting system of the generator, means for supplying an alternating current to the rectifier having a component proportional to the load on the generator and a component independent of the load, a reactor through which said alternating current flows, a first direct-current winding on the reactor connected in series with the rectifier, a second direct-current winding on the reactor, a second rectifier connected to said second winding and a resonant circuit connecting the second rectifier to the generator voltage, and means connected in said circuit to compensate for the effect of changes in the frequency of the voltage.

14. A system for regulating the voltage of an alternating current generator comprising a rectifier for supplying direct current to the exciting system of the generator, means for supplying alternating current to the rectifier and means for controlling said alternating current in response to changes in the generator voltage comprising an iron-core reactor connected to the rectifier circuit and having a direct current winding, a second rectifier connected to said winding, a resonant circuit connecting said second rectifier to the generator voltage, and means connected in said resonant circuit to compensate for the effect of changes in frequency of the generator voltage caused by changes in load, said last mentioned means comprising a device connected in said resonant circuit for introducing therein a voltage proportional to the load and in phase opposition to the voltage impressed on the resonant circuit by the generator.

15. A system for regulating the voltage of a three-phase alternating current generator comprising a rectifier for supplying direct current to the exciting system of the generator, means for supplying alternating current to the rectifier and means for controlling said alternating current in response to changes in the generator voltage comprising an iron-core reactor connected to the rectifier circuit and having a direct current winding, a second rectifier connected to said winding, a resonant circuit connecting said second rectifier to the generator voltage, said resonant circuit being connected across two phase conductors of the generator, and means to compensate for changes in frequency of the generator voltage caused by changes in load, said last mentioned means comprising an air-core transformer having a primary winding connected in series with the third phase conductor and a secondary winding connected in series with said resonant circuit.

OSKAR SCHMUTZ.